Dec. 20, 1949     L. J. BULLIET     2,492,092
MATERIAL WORKING APPARATUS
Filed Feb. 13, 1946     8 Sheets-Sheet 1

Inventor
Leander Jackson Bulliet
By: Moore, Olson & Trexler Attys.

Dec. 20, 1949     L. J. BULLIET     2,492,092
MATERIAL WORKING APPARATUS
Filed Feb. 13, 1946     8 Sheets-Sheet 4

Inventor
Leander Jackson Bulliet
By: Moore, Olson & Trexler attys

Dec. 20, 1949 — L. J. BULLIET — 2,492,092
MATERIAL WORKING APPARATUS
Filed Feb. 13, 1946 — 8 Sheets-Sheet 5

Inventor
Leander Jackson Bulliet
By: Moore, Olson & Trexler attys.

Dec. 20, 1949  L. J. BULLIET  2,492,092
MATERIAL WORKING APPARATUS
Filed Feb. 13, 1946  8 Sheets-Sheet 6

Inventor
Leander Jackson Bulliet
By: Moore, Olson & Trexler
attys

Patented Dec. 20, 1949

2,492,092

UNITED STATES PATENT OFFICE 2,492,092

MATERIAL WORKING APPARATUS

Leander Jackson Bulliet, Rockford, Ill., assignor to Odin Corporation, Chicago, Ill., a corporation of Illinois Application February 13, 1946, Serial No. 647,378

1 Claim. (Cl. 77—5)

This invention relates to material working apparatus, and concerns particularly means and methods of control for machine tools and the like, whereby to effect the accurate control of machining operations performed upon a work piece.

In the particular illustrative embodiment hereinafter to be set forth, the invention concerns specifically the operation and control of a machine tool, such for example as a drill unit, for effecting the weight balance control of a work piece.

In the balancing of crank shafts, or other rotatable machine parts, it is customary to mount the work piece into a balancing machine and subject it to high speed rotation, simulating conditions encountered in the ultimate operation of the part in service. The irregularity, or "out of balance" condition of the work piece is recorded upon suitable gauging devices associated with the balancing machine. Correction or balancing of the work piece is then effected by removing a predetermined quantity of metal therefrom in a particular location on the part, so as to bring it into the proper balanced or desired weight condition. The metal removing operations may be effected by various machine tool operations such as, for example, by drilling, or milling, or the like.

For best results a high degree of accuracy is required in the control of the metal removing machine tool, so that an accurately predetermined weight of metal will be removed from the work piece at the desired point. The difficulties are generally further magnified due to the irregularities in shape of the cutting tool which effects the metal removal. Thus for example a drill, provided with a pointed end, will remove a constantly increasing volume of metal from the work piece in proportion to linear tool displacement until the tool point is completely embedded into the work, after which there will be a direct proportional relation between volume or weight removal and tool linear displacement.

In accordance with the present invention improved means and methods are provided for effecting the accurate control of a machine tool, such for example as a drill unit, whereby to accurately control the limits of a machining operation effected upon a work piece. The invention further provides improved means and methods for automatically setting the controls of the machine tool from a remote point, in accordance with the control limits required; and further provides for the automatic translation and control of the cutting tool whereby weight settings on the controls of the machine are automatically translated into the proper tool displacements, so as to compensate for irregularities in tool shape.

Accordingly it is an object of the invention to provide improved means and methods for effecting the accurate control of machine tools and the like, whereby to accurately predetermine the extent and mode of the cutting operation.

A further object of the invention is to provide improved means and methods for effecting the machine operation by remote control.

A further object of the invention is to provide improved means and methods for automatically translating a control setting calibrated in one function, as for example weight, into tool movement in another function, as for example linear travel.

A still further object of the invention is to provide an improved translating and calculating mechanism, of the general type set forth;

Various other objects, advantages and features of the invention will be apparent from the following specification when taken in connection with the accompanying drawings, wherein certain preferred embodiments are set forth for purposes of illustration.

In the drawings, wherein like reference numerals refer to like parts throughout.

As previously indicated, the invention is herein shown applied to a combined balancing machine and drill unit installation, the cutting tool of the drill unit being automatically and accurately controlled from the remotely disposed balancing machine station; the principles of the invention being particularly adapted to the arrangement set forth. It is to be understood, however, that such principles may be adapted for various specific control purposes, and that variations may be made within the scope of the appended claims.

*General machine structures and mode of operation*

Figure 1:
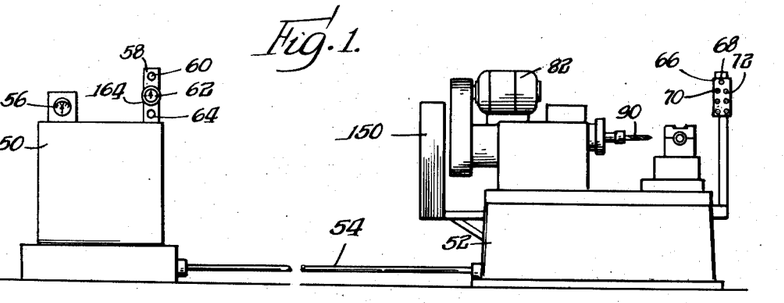
Fig. 1 is a general assembly view, diagrammatic in form, of a balancing machine and machine tool installation constructed in accordance with and embodying the principles of the invention.

Referring more specifically to the drawings, and first to Fig. 1, the installation shown comprises a balancing machine diagrammatically indicated at 50, and a machine tool, specifically a drill unit, remotely disposed in respect to the balancing machine and indicated by the numeral 52. The machines are interconnected by an electric cable 54, and may be located in the same room, or in different room, as desired.

The balancing machine may be of any suitable form and construction conventionally used in the balancing of machine parts such as crank shafts, the details of the machine forming no part of the present invention. As previously indicated, such machines are provided with means for mounting and rotating the crank shaft or other part to be tested, the "out of balance" condition of the part being indicated by suitable dials associated with the machine, for example as indicated at 56.

The balancing machine includes a panel board 58 having an indicator lamp 60, a calibrated dial knob 62 and a control push button 64 for use by the operator of the balancing machine. In operation, after testing a particular work piece, the balancing machine operator adjusts the dial knob 62 to a position indicative of the amount of "out of balance" in the work piece, which constitutes a measure of the weight of material to be removed therefrom. He then presses the push button 64, which indicates that the setting has been made. During the adjustment of the knob 62 and the operation of the button 64, the drilling machine 52 may be machining a previous work piece or doing any other desired drilling operation.

The drilling machine includes a control panel 66 having an indicator lamp 68, a "Cycle start" push button 70, a "Transfer" push button 72, and certain other push buttons later to be described.

The operator of the drilling machine transfers the setting from dial knob 62 into the drilling machine control mechanism by pressing the "Transfer" push button 72 after the drilling machine has completed its previous drilling operation. The indicator lamps 60 and 68 become lighted and remain lighted during the transfer operation, indicating to both operators that a transfer from the balancing machine to the control mechanism of the drilling machine is being effected. After the balance tested work piece has been removed from the balancing machine and mounted in the drilling machine, the drilling machine operator then initiates the automatic drilling operation, in accordance with the control mechanism setting, by depressing the "Cycle start" button 70. The drilling machine will thereupon operate automatically to remove the predetermined weight of material from the work piece.

It will thus be seen that the control of the drilling machine may be effected directly in accordance with the findings of the balancing machine, in an automatic and expeditious manner.

*Drilling machine structure*

Figure 2:
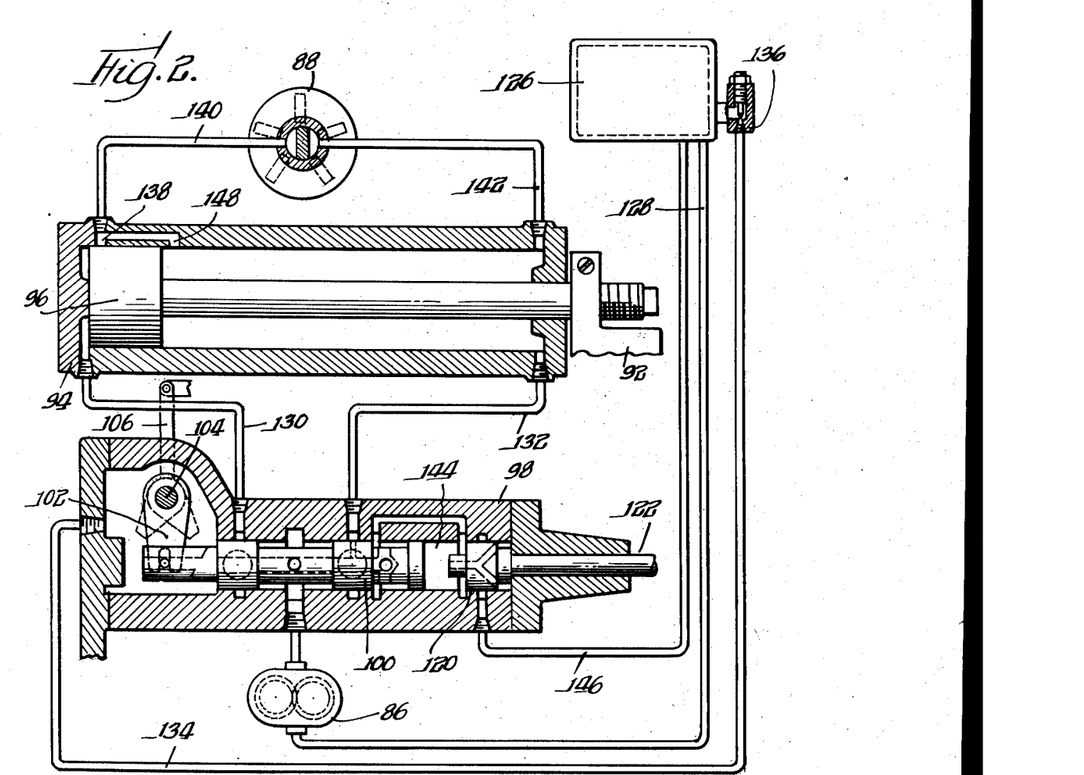
Fig. 2 is a diagrammatic view of the hydraulic control circuit for the machine tool, which comprises a drill unit in the particular embodiment set forth.
Figure 3:
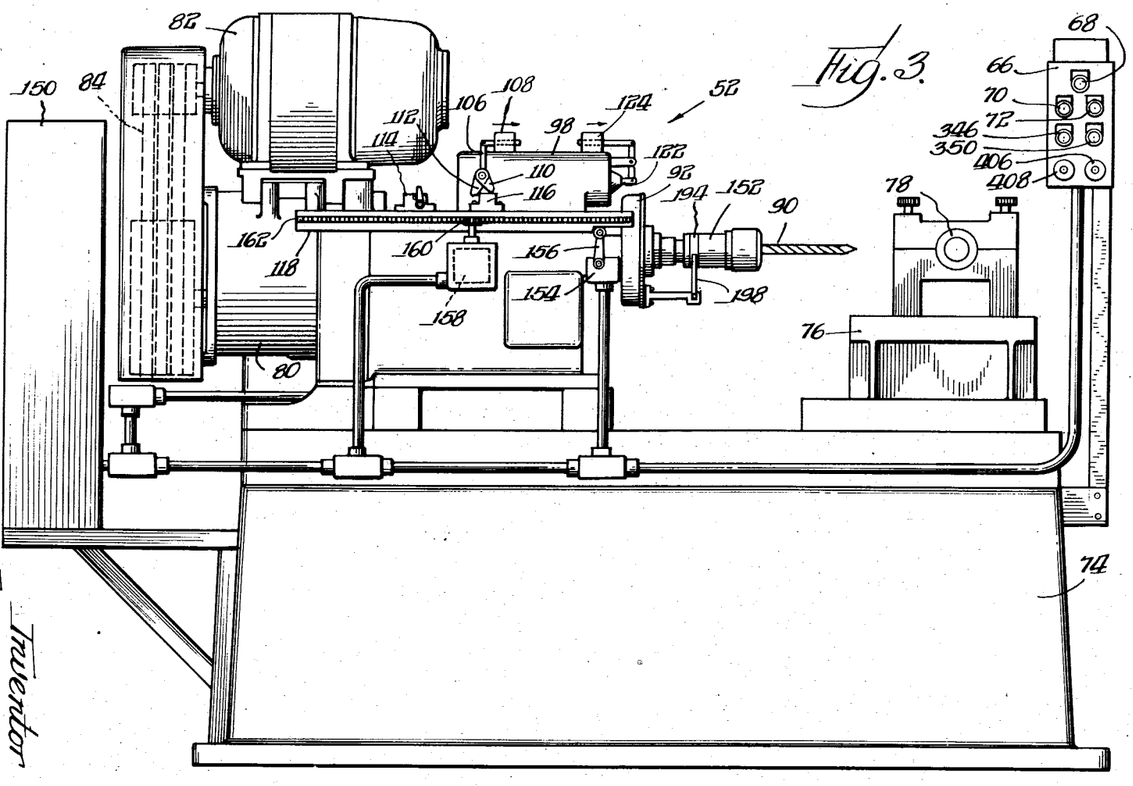
Fig. 3 is a side elevation of the drill unit.

The drilling machine and its hydraulic control circuits are shown in Figs. 2 and 3. The details of the drilling machine also form no part of the present invention. The machine may, for example, be of the type shown in the patent to E. J. Svenson, No. 2,178,364.

As shown in Fig. 3, the machine comprises a bed 74 having a work support 76 for supporting the work piece, such as indicated at 78. A head stock 80 is provided upon which is mounted a prime mover or electric motor 82 operable to rotate the tool through a belt drive 84, and also operable to drive the pumps forming a part of the hydraulic propelling circuit for the machine. As shown in Fig. 2, these pumps may comprise a low pressure, high volume gear pump 86 and a variable displacement low volume and high pressure plunger pump 88. The rotatable tool 90 is carried by a reciprocable head structure 92, which as fully explained in said Patent No. 2,178,364, is reciprocated longitudinally relative to the main head frame 80 at rapid traverse and feeding speeds by a hydraulic actuator comprising a cylinder 94 and a piston 96, Fig. 2.

A control valve 98, Figs. 2 and 3, is provided for controlling the movements of the hydraulic actuator piston. The control valve is provided with a shiftable valve member 100 adapted for actuation by a lever 102 fixed to a pivot shaft 104. Externally of the valve body this pivot shaft carries an arm 106 operable by an electromagnet 108, and a pair of cams 110 and 112 operable, respectively, by a feed dog 114 and a stop dog 116 adjustably carried by a dog bar 118 secured to and movable with the reciprocable tool head 92. The valve structure further includes a shiftable piston 120 carried by a stem 122 projecting from the valve structure and arranged for operation by an electromagnet 124.

In operation, and as is more particularly pointed out in said Patent No. 2,178,364, when the valve member 100 is shifted to the left as seen in Fig. 2, for example upon actuation of the arm 106 by the energization of electromagnet 108, the actuator piston is caused to approach the work or move to the right at a rapid traverse speed, the propelling fluid being drawn from the reservoir 126 through line 128, and being propelled by the gear pump 86 through the valve and to the actuator through the line 130. The return fluid from the actuator passes through line 132, the valve, and then back to the reservoir.

through line 134 at a back pressure determined by the orifice device 136. As the piston moves away from the port 138, fluid from the plunger pump also circulates to the actuator through line 140 and from the actuator through line 142, whereby to augment the piston travel speed.

Shortly prior to the time the tool engages the work, the feed dog 114 shifts the valve member 100 to its neutral position shown in Fig. 2, whereupon fluid from the gear pump circulates through the valve and is returned through line 134 without passing to the actuator. The actuator accordingly progresses under propulsion of the pump 88 at the predetermined feeding rate thereof.

At the end of the cutting or drilling movement, to effect the reversal of the tool head, the solenoid 124 is energized to project the piston 120 to the left as seen in Fig. 2. As is more particularly pointed out in said Patent No. 2,178,364, this causes an interconnection of the valve chamber 144 with the reservoir through the pressure relief line 146, whereby to unbalance the valve 100 causing it to be shifted rapidly to the right or to a "Reverse position." Fluid from the gear pump 86 is now transmitted from the valve 98 to the actuator through the line 132, causing reversal of the actuator until the stop dog 116 again shifts the valve 100 to its neutral or central position whereupon fluid from the gear pump again circulates through the valve structure without transmission to the actuator, and fluid from the plunger pump circulates through the actuator through port 148, and the actuator piston remains at rest in its starting position.

The control mechanism hereinafter to be described is provided for accurately controlling the precise time of operation of the reversing electromagnet 124, so as to cause the drill to be withdrawn after it has removed an accurately predetermined volume or weight of metal from the work piece.

This control mechanism includes a series of control devices within the control box 150 and the control panel 66 previously described. It also includes a spindle structure 152, Fig. 3, which has a switch operated at the precise instant that the tool engages the work; a control switch 154 operated from the dog slide 118 through a switch arm 156 as the dog slide moves to the right or away from home position; and a self-synchronous transmitter 158 connected to and operated from a gear 160 engageable with a rack 162 fixed to the dog bar. The transmitter 158 is of the type known as a "Selsyn" or "Teletorque" device. A similar "Selsyn" or "Teletorque" transmitter 164, Fig. 1, is connected to and operated by the control knob 62 of the balancing machine control panel.

*Spindle control switch*

Figure 11:
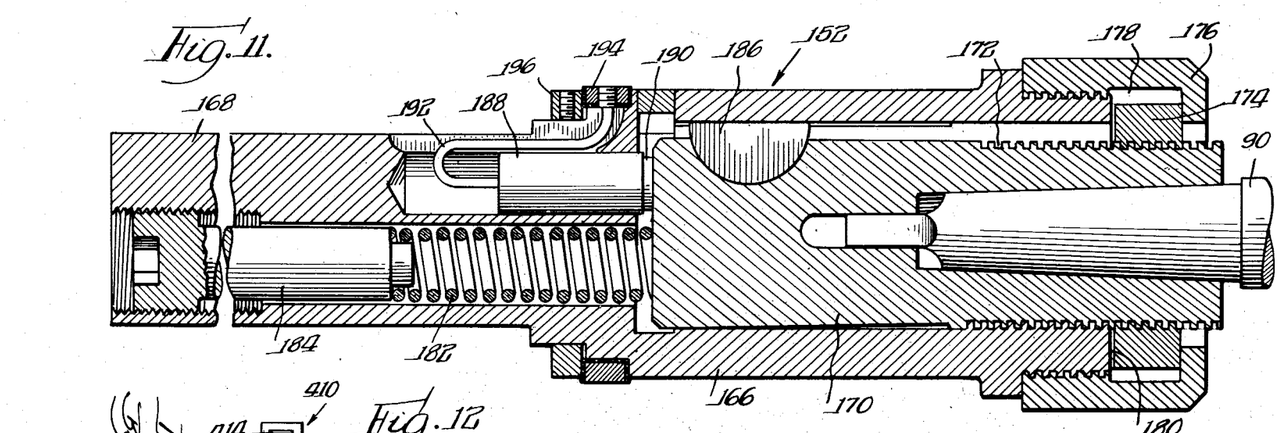
Fig. 11 is an enlarged detail view of the tool spindle forming a part of the drill unit of Fig. 3.

The spindle control switch structure 152 is shown in detail in Fig. 11.

As will be understood, the time of engagement between the tool and the work will vary in accordance with the setting of the work piece upon the work support 76, and also in accordance with irregularities in the surface contours of the work piece. The purpose of the switch structure 152 is to determine accurately the time of engagement between the tool and the work, so that the point of tool reversal may be accurately calculated therefrom.

The spindle switch structure 152, as shown in Fig. 11, comprises a main housing 166, the end 168 of which is arranged to be carried by the reciprocable tool head 92. At its opposite end the housing slidably carries an adapter 170 which supports the drill 90. The adapter is threaded at its outer end 172 and adjustably carries a nut 174. The nut is arranged to bear against the end face of the housing 166, or against the inwardly projecting flange portion of an adapter ring 176 threaded onto the housing end. The annular channel 178 defined by the adapter ring is slightly wider than nut 174, whereby to provide a slight spacing as indicated at 180 between the nut and the housing end when the nut engages the adapter ring flange.

A compression spring 182 bears against the adapter so as normally to urge it to the right, to the limit of travel allowed by the nut, as shown in Fig. 11. The spring pressure is adjustable by a screw threaded plug member 184. A key 186 precludes rotation of the adapter 170 relative to the housing.

A switch structure of any approved type but preferably of the type shown in Fig. 9 of the copending application of L. J. Bulliet, Serial No. 569,027, filed December 20, 1944, and comprising a body portion 188 and a shiftable plunger 190 therein, is carried by the spindle structure. The switch is normally closed, when the parts are in the position shown in Fig. 11, and is arranged to be shifted to open position upon a shifting of the adapter and the plunger 190 engaged thereby to the left against the action of spring 182 and relative to the switch body as the tool engages the work piece. The switch is opened just prior to the time that the nut 174 engages the end face of the housing 166 to absorb the tool thrust. One contact of the switch is grounded to the spindle, and the other contact thereof is connected by means of an electric wire 192 to a metal ring 194 insulated from the housing and held in position by a retainer ring 196. A brush 198, Fig. 3, carried by but insulated from the head 92, provides a pick-up from the ring 194 during spindle rotation.

It will be seen that by the arrangement thus provided the normally closed switch structure 188—190 is arranged to be opened accurately and immediately as the tool and work become engaged.

*Tool reversal control structure*

The mechanism for reversing the tool upon penetration thereof to the desired predetermined depth is shown in Figs. 4–10.

An insulating base 200 is mounted within the control box 150 of the drilling machine. This base carries a pair of self-synchronous receivers 202 and 204 electrically interconnected with the self-synchronous transmitter 158. As will more particularly appear later in connection with the description of the electrical circuit, and as is characteristic of "Selsyn" or "Teletorque" devices, the rotors of the receivers 202 and 204 will move synchronously with the rotor of the rack actuated transmitter 158, whenever the receivers are in electrical connection therewith. The receiver rotors are so connected that they are both operated in the same direction, for example clockwise as viewed in Fig. 6, as the transmitter 158 is operated by a work approaching movement of the dog bar rack 162.

Figure 5:
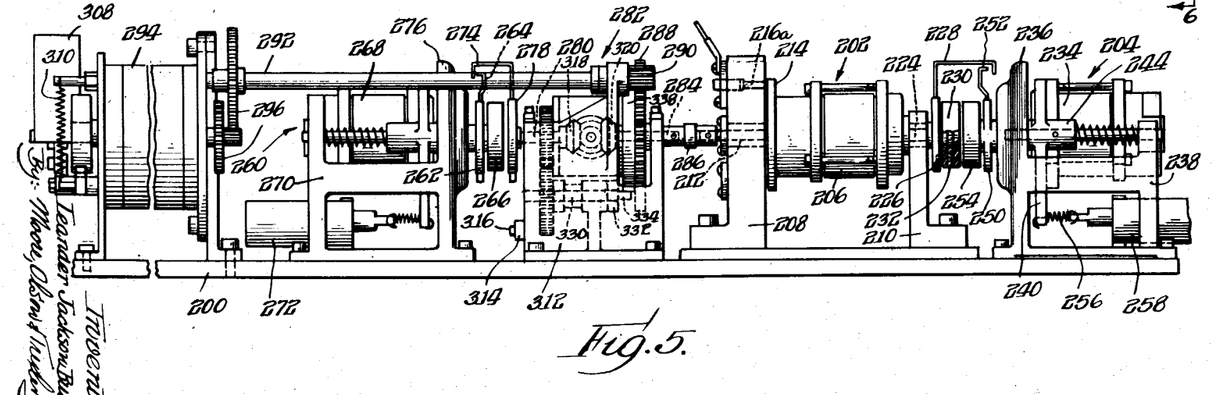
Fig. 5 is a side view of the control mechanism shown in Fig. 4.
Figure 8:
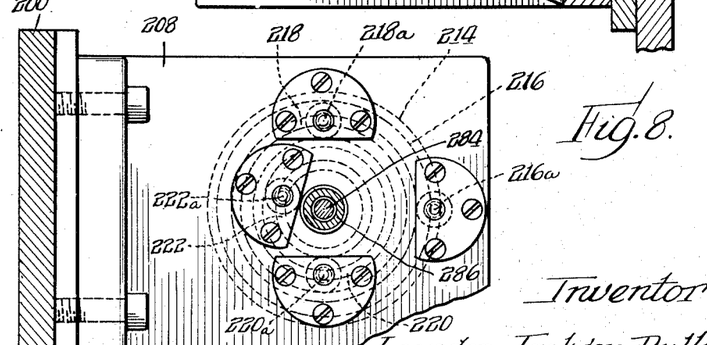
Fig. 8 is an enlarged transverse sectional view on the line 8—8 of Fig. 4.

The housing 206 of the receiver 202 is journalled for rotation between a pair of support pedestals 208 and 210 carried by the base plate 200. A shaft 212 is fixed to the housing 206 and moves therewith. As best shown in Figs. 5 and 8, the housing 206 has fixed thereto a contact plate 214 carrying a series of four concentric slip rings 216, 218, 220 and 222 which are engaged, respectively, by a series of four spring pressed brushes 216a, 218a, 220a and 222a, mounted within the pedestal 208; the arrangement thus being such that the receiver is maintained in proper electrical contact with its actuating circuits in any position of housing rotation.

Figure 7:
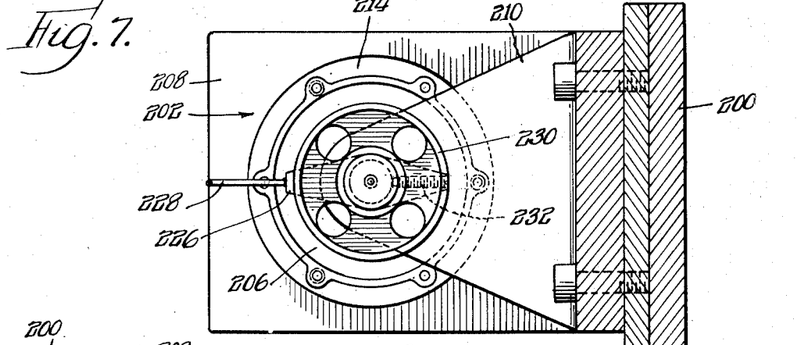
Fig. 7 is an enlarged sectional view on the line 7—7 of Fig. 4.

As best shown in Figs. 5 and 7, the rotor of the receiver 202 is connected to a shaft 224, the end of which carries a transversely positioned arm 226 having a contact wire or finger 228 of a shape as shown. A hub extension of the arm 226 carries a damper wheel 230 loosely journalled thereon. This damper wheel is held from axial displacement by means of a set screw 232 carried by the wheel and loosely engaging an annular groove in the hub extension, the arrangement thus being such that the damper wheel is prevented from axial shifting but is free to move rotatably relative to the arm 226 and its connected shaft 224. The damper wheel, mounted as thus provided, reduces vibration of the shaft 224, due to any sudden starting, stopping, or speed changes.

Figure 4:
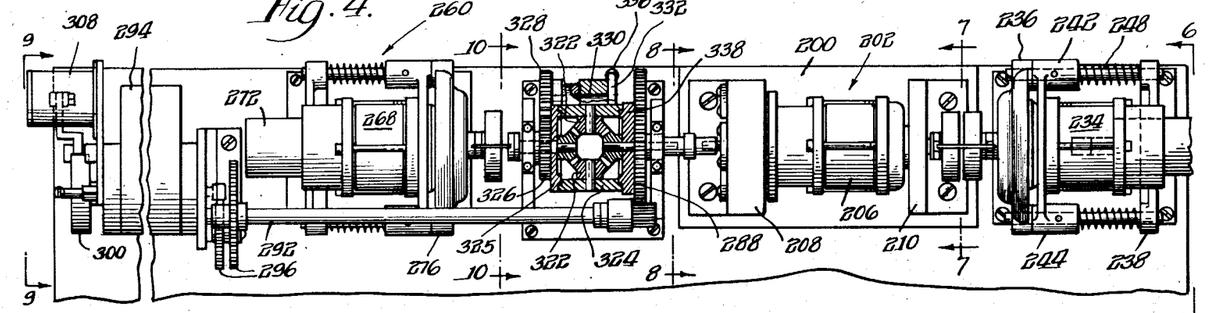
Fig. 4 is a top view, partly in section, of the control mechanism forming a part of the drill unit.
Figure 6:
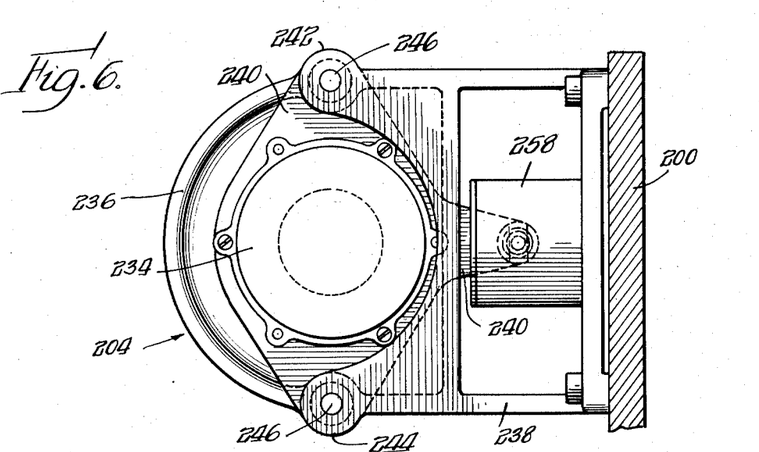
Fig. 6 is an enlarged right end view of the control mechanism, as viewed on the line 6—6 of Fig. 4.

The housing 234 of the receiver 204 is fixed against rotational movement, but is arranged for limited axial movement within a bracket structure carried by the base plate 200 and consisting of a front plate portion 236 and a rear yoke portion 238. As best shown in Figs. 4, 5 and 6, the receiver housing 234 carries a plate 240 having oppositely positioned bosses 242 and 244 within which are pinned a pair of shafts 246. These shafts are longitudinally slidable within the plate 236 and the upstanding arms of the yoke member 238, and each shaft is embraced by a compression spring 248 which normally urges the receiver housing to the left as seen in Figs. 4 and 5 so as to bring the bosses 242 and 244 into engagement with the fixed bracket plate 236, as shown.

The rotor of the receiver 204 has fixed thereto a transversely extending arm 250, similar to the arm 226, previously described, the arm carrying a contact finger 252, as shown, arranged for cooperation with the contact finger 228 previously described. The hub portion of the arm 250 carries a loosely journalled damper wheel 254, in the manner and for the purpose of the damper wheel 230, previously described.

The plate 240 has a depending extension to which is secured one end of a tension spring 256, the opposite end of which is connected to the armature of an electromagnet 258. When the electromagnet is energized, the plate 240 and the connected receiver housing 234 is drawn to the right as seen in Fig. 5, guided by the shafts 246, until the arm 250 engages the fixed bracket plate 236. In this position of the parts the contact fingers 228 and 252 are positioned for abutting contact upon relative rotation of the two receiver rotors, as distinguished from the position of the parts illustrated in Fig. 5, wherein the fingers may rotate relative to each other without any physical or electrical contact.

As will be more particularly described in the statement of operation hereinafter to be set forth, during the time that the tool is approaching the work piece, and prior to contact therewith, the electromagnet 258 is deenergized and the rotors of both receivers 202 and 204 are electrically connected with the transmitter 158 for movement therewith, so that no relative motion occurs between the contact fingers 228 and 252. As the tool engages the work, and the normally closed spindle switch 188—190 is opened, the rotor of the receiver 204 is disconnected from the transmitter, electromagnet 258 is energized to bring the contact fingers 228 and 252 into alignment; and simultaneously the axial movement of the arm 250 also serves to prevent further rotation of the arm immediately as it engages the bracket plate 236. As the tool continues to penetrate the work piece, the contact finger 228 continues to move with the forward projection of the tool until the contact fingers 228 and 252 come into engagement, whereupon electrical circuits are actuated to energize the reverse solenoid 124, Fig. 3, and retract the tool.

As will be understood, the rotatable position of the receiver housing 206 determines the initial angular spaced relationship between the contact fingers 228 and 252 (for any given electrical interconnection between the rotors of the transmitter and the receivers), the receiver housing position thus presetting the amount of tool penetration. The means for setting the angular position of the receiver housing 206, and its connected shaft 212, will now be described.

*Remote control mechanism*

A self-synchronous receiver 260 of the "Selsyn" or "Teletorque" type has its rotor electrically interconnected with the rotor of the balance machine transmitter 164, in the same manner that the rotors of the receivers 202 and 204 are interconnected with the rotor of the drill unit dog slide transmitter 158. The rotor of the receiver 260 carries an arm 262 having a contact finger 264, the arrangement being similar to the arrangement of the arm and finger 250—252, previously described. The arm hub also loosely carries a damper wheel 266, for the purpose previously described. The housing 268 of the receiver 260 is mounted for limited axial movement within its frame support bracket 270, under actuation of an electromagnet 272, in the same manner as the receiver housing 234, previously described. When the parts are in the position illustrated in Fig. 5, the contact finger 264 may rotate freely without engagement with its cooperating contact finger 274, but when the electromagnet 272 is energized, the arm 262 is drawn to the left as seen in Fig. 5, locking the arm against rotation by reason of its engagement with the frame plate 276, and also aligning the contact fingers 264 and 274 for abutting engagement. When the parts are in the position shown in Fig. 5, and prior to energization of the electromagnet 272, the rotatable adjustment of the arm 262 will be effected in accordance with the setting of the knob 62, Fig. 1, of the self-synchronous transmitter 164.

The contact finger 274 is carried by an arm 278 fixed to a shaft 280 forming one part of a differential gearing structure, and translating mechanism, generally indicated by the reference numeral 282. The structure and function of this differential and translating mechanism will be later described, suffice to say at this point, that by means of this mechanism the shaft 280 is geared to a shaft 284 forming another part of this differential gearing, this latter shaft being coupled with the shaft 212 by means of a suitable coupling connection 286.

Figure 9:
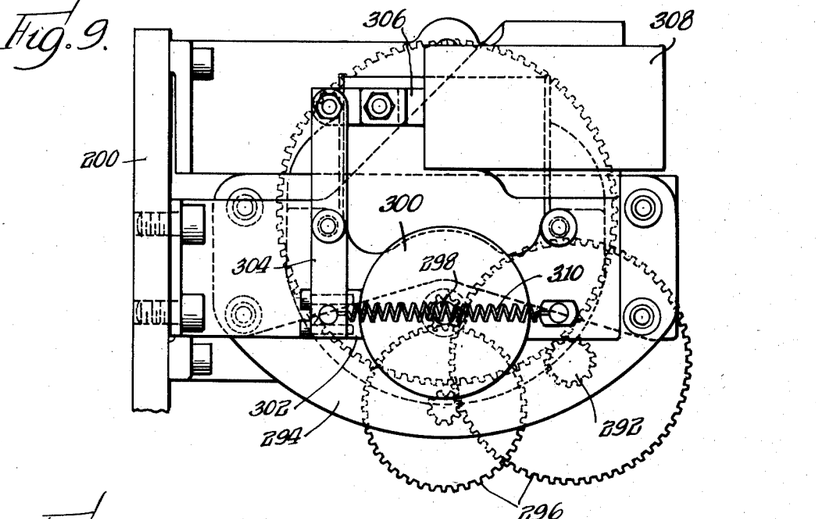
Fig. 9 is an enlarged left end view of the control mechanism taken as indicated by the line 9—9 of Fig. 4.

The shaft 284 carries a gear 288 which meshes with a gear 290 secured to the end of an elongated drive shaft 292. The shaft 292 is arranged to be driven from an electric motor 294 through a suitable reduction gearing as indicated at 296. It will be seen that by reason of the construction provided, as the motor 294 is operated rotation is imparted to the shaft 284, which through the differential gearing and translating mechanism 282 imparts rotation to the shaft 280, so as to rotatably drive the contact finger 274. As best shown in Fig. 9, the drive shaft 298 of the electric motor 294 carries a brake disc 300. This disc is adapted to be engaged by brake shoe 302 fastened to one end of a pivot arm 304, the opposite end of which is pivotally connected to the armature 306 of an electromagnet 308. A spring 310 normally holds the brake shoe 302 in engagement with the disc 300, whereby to hold the motor drive shaft 298 against operation. The electromagnet 308 is energized to disengage the brake simultaneously with the energization of the motor 294, and is deenergized to apply the brake simultaneously with the deenergization of the motor.

Figure 10:
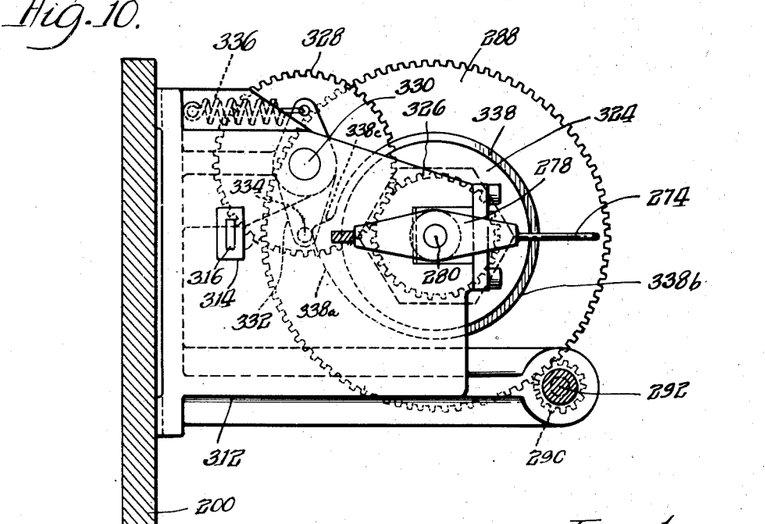
Fig. 10 is an enlarged transverse sectional view taken as indicated by the line 10—10 of Fig. 4.

As best shown in Figs. 5 and 10, the support bracket 312 for the differential and translating mechanism carries on one face thereof a switch block 314 having a switch arm 316 which is adapted to be momentarily closed by the contact finger 274 as it passes the switch block.

In the operation of the remote control mechanism, the rotor arm 262 of the receiver 260 is normally in the position shown in Fig. 5, at which time any adjustment of the balance machine setting knob 62 will be correspondingly transmitted to the arm 262 to effect its rotatable positioning. The full range of adjustment of the arm 262 comprises approximately 330°, the contact finger 264 of the arm never moving into a position directly opposite the switch structure 314. As has been previously brought out, the balance machine transmitter knob 62 may be freely adjusted during the time that the drilling machine is in operation upon a previous work piece.

When it is desired to transfer or fix the setting of the arm 262 into the drilling machine tool depth control mechanism the "Transfer" button 72 is operated as previously described. This energizes the motor 294 and the electromagnet 308, causing operation of the motor to rotate shafts 284 and 280. As the contact finger 274 engages the switch arm 316, the solenoid 272 is energized shifting arm 262 to the left as seen in Fig. 5, thus locking the arm in its rotatable adjusted position and bringing the contact fingers 264 and 274 into alignment. It will be noted that the energization of solenoid 272 occurs when the finger 274 is opposite the switch 314, a zone into which the contact finger 264 never moves. Accordingly it is insured that the contact fingers cannot be in axial alignment when the finger 264 is axially shifted, which might result in improper operation of the parts. The rotation of arm 278 continues until the contact fingers 274 and 264 are brought into engagement, whereupon the motor 294 and the brake solenoid 308 are deenergized, thus positioning the shaft 284, and the shaft 212 coupled thereto, into desired position. As previously described, the setting of shaft 212 determines the rotatable positioning of the housing 206 of receiver 202, which in turn determines the depth of the tool cut.

*Translating mechanism*

As previously pointed out, the setting which is transmitted to the arm 262 from the balance machine, and resultingly to the arm 278 and shaft 280, is in terms of the weight of metal to be removed by the drill. The setting of shaft 284 and connected shaft 212, however, must be in terms of the desired lineal penetration of the tool into the work. Due to the fact that the tool is provided with a point on its end, and thus is of irregular shape, a direct proportional relationship does not exist between the weight and lineal penetration factors. The purpose of the translating mechanism is to calculate and "translate" the weight setting into lineal penetration terms.

Shafts 280 and 284 are provided, respectively, on their ends with bevel gears 318 and 320. As best shown in Fig. 4, these bevel gears mesh with a pair of bevel gears 322 carried by a rotatable cage 324 of a differential gearing structure. The cage is fixed to a plate 325 loosely journalled on the shaft 280, said plate having fixed thereto a gear 326, Figs. 4 and 10, meshing with a gear 328, the latter gear being fixed to one end of a shaft 330 journalled in the frame structure 312. The end of the shaft 330, opposite to the gear 328, carries a cam follower arm 332 having a follower roller 334 on its end, the arm being spring urged by a tension spring 336 so that the follower roller is maintained in engagement with a cam 338, Figs. 4, 5 and 10. This cam is fixed to the shaft 284, and hence is rotatable relative to the differential cage 324, but is rabbeted to form a journal bearing therefor.

In the operation of the translating mechanism the gear 288 and shaft 284 will be operated by the motor 294 during the transfer setting operation, as previously described. Rotation of shaft 284 causes rotation of bevel gear 320 and of the cam 338, both of which are fixed on the shaft. Rotation of the cam acts through the cam follower arm 332 and shaft 330 to impart a predetermined rotational movement to the gear 326 and the differential cage 324 to which this latter gear is fixed. Inasmuch as the movement imparted to the bevel gear 318 and its connected shaft 280 is the summation of the movements of the differential cage and the bevel gear 320, it will be seen that the variation in movement between the shafts 280 and 284, from a direct proportional relationship, is determined by the contour of the cam 338. If the cam contour is circular, the two shafts will move in direct proportional relationship, whereas any rise or fall in the cam will produce a difference.

The contour of the cam will be empirically determined in accordance with the requirements of any installation, and a different cam substituted for each tool. The cam 338, as shown in Fig. 10, effects the proper calculation and translation from weight to linear displacement, in connection with the particular pointed drill 90 of Fig. 3. In this connection it will be noted that the cam has a tapered surface 338a operable in respect to the drill point, and a substantially circular portion 338b operable in respect to the drill body. The cam portion 338c operates when the contact finger 274 is in the zone of the switch 314 to return the cam follower to initial calculating position. Inasmuch as the same is fixed to the shaft 284 which is in turn fixed to the shaft 212 and in geared relationship with the shaft 280, the proper relative positioning of the parts is continuously preserved.

*Electrical structures*

Figure 15:
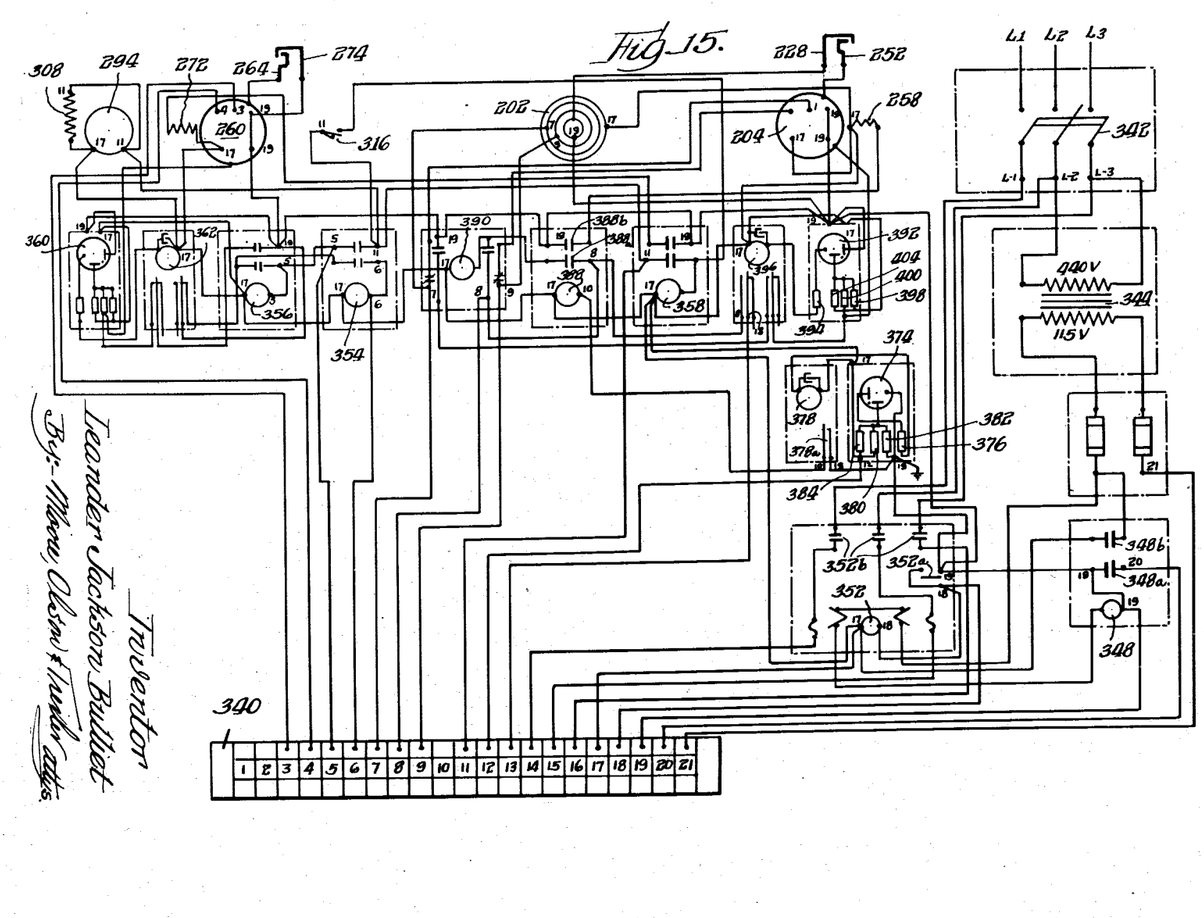
Fig. 15 is a wiring layout for the control panel of the drill unit.
Figures 16, 17:
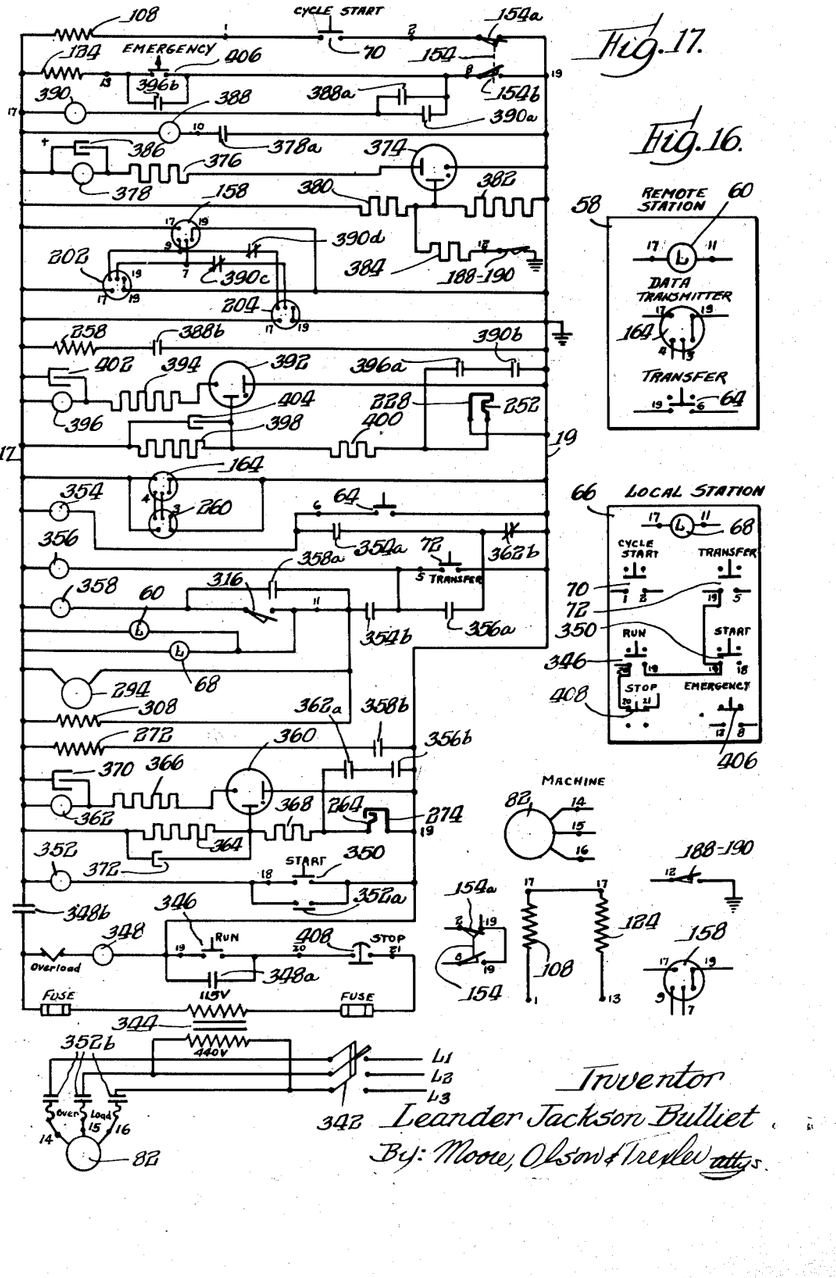
Fig. 16 is a schematic layout of the wiring at the various control stations and parts.
Fig. 17 is a line diagram of the complete electric circuit.

Fig. 15 illustrates the electrical wiring of the parts within the drilling machine control panel 150. Fig. 16 illustrates the wiring of the parts at the balancing machine control panel 58, at the drilling machine control panel 66, and upon the drilling machine structure. Fig. 17 is a line diagram of the entire electrical circuit.

Corresponding reference numerals 3—9 and 11—21 appear in Figs. 15—17 so that each terminal point as set forth in Fig. 17 may be readily found in Figs. 15 or 16. As will be understood, the elements of Fig. 15 are interconnected to those of Fig. 16 through the intermediary of the terminal connector strip 340, Fig. 15.

It is believed that the electrical circuit will be best understood by means of a detailed description of the machine operation, referring particularly to the line diagram, Fig. 17.

Operation

To put the machine into operation, the drilling machine operator first closes the manual disconnect switch 342 which connects the circuit with a suitable source of electrical power, such for example as 3-phase 440 volt alternating current. The closing of switch 342 energizes the control circuit at reduced voltage, through the action of transformer 344. The drilling machine operator then presses the "Run" push button 346 which energizes the coil of a master relay 348. One contact 348a of this relay closes and establishes a holding circuit around the push button 346, which may be only momentarily depressed. Another contact 348b of the master relay 348 also closes whereby to supply the current from the transformer secondary through the contacts 348a and 348b to the control circuit of the machine, and more particularly to the main supply wires 17 and 19. The drilling machine operator next momentarily pushes the "Start" push button 350 which picks up or energizes the motor starter relay 352. One set of contacts 352a close to establish a holding circuit for the motor starter. Additional contacts 352b are simultaneously closed to apply the 440 volt line current to the motor 82. The motor thereupon starts driving the drilling tool spindle and the pumps 86 and 88 of the drilling machine hydraulic circuit, as previously described.

It will be seen that the self-synchronous transmitter 164 has its rotor windings interconnected with the receiver 260, as previously described, so that while the control circuit wires 17 and 19 are energized any movement imparted to the rotor of the transmitter will be correspondingly imparted to the rotor of the receiver.

After the setting of the transmitter knob 62 has been made, the operator at the balancing machine presses his push button 64 to indicate that he has completed his setting. Momentary pressing of this push button energizes the coil of a relay 354 which thereupon closes its contacts 354a and 354b. The closing of contact 354a establishes a holding circuit around the push button 64.

The foregoing operations may be effected while the drilling machine is machining a previous work piece, as has been described. At the end of the machining operation the operator at the drilling machine presses his "Transfer" push button 72. Momentary closing of this push button energizes the coil of a relay 356 which thereupon closes its contacts 356a and 356b. The closing of contacts 356a establishes a holding circuit around the push button 72.

Inasmuch as contacts 354b and 356a are now both closed, current is transmitted to the transfer motor 294 and to the brake release solenoid 308, the motor thereupon operating to rotate shafts 284 and 280, as previously described. Current is simultaneously transmitted to the two lamps 60 and 68 whereby to indicate to both operators that a transfer of the control setting is being effected.

When the contact finger 274 engages and closes switch 316, the coil of a relay 358 is energized which thereupon closes its contacts 358a and 358b. Closing of contacts 358a establishes a holding circuit around the switch 316. Closing of contacts 358b effects the energization of solenoid 272 which thereupon operates as previously described to shift the contact finger 264 to the left as seen in Fig. 5, into the path of travel of the moving contact finger 274.

When the contact fingers 264 and 274 are brought into engagement a cold cathode gaseous discharge tube 360 effects the energization of a relay as shown at 362. Normally, and prior to engagement of the contact fingers 264 and 274, it will be seen, Fig. 17, that the grid or starting electrode of the tube 360 is connected to the line 17 through a resistor 364. The tube cathode is also connected to the same power line 17 through a resistor 366 and the coil of relay 362. Thus the tube cathode and grid are at the same voltage and the tube does not conduct current. When the fingers 264 and 274 make contact, the resistor 364 and a resistor 368 form a voltage divider between the power lines, with the tube grid connected therebetween. The resistance of resistor 368 is less than that of resistor 364 so that the grid is now near the tube anode in potential, and the tube conducts current, thus energizing the coil of relay 362. The resistor 366 forms a current limiting element for the tube, and the capacitor 370 is a filter to reduce the ripple in the current rectified by the tube 360. The capacitor 372 is a filter against parasitic surges. The total resistance of the resistors 364 and 368 is sufficiently high, one megohm or more, to prevent arcing at the contact fingers 264 and 274.

Energization of relay 362 closes its contacts 362a, forming a holding circuit to keep the tube conducting and the relay 362 energized. The energization of the relay also opens a pair of normally closed contacts 362b which deenergizes the transfer motor 294 and its brake solenoid 308. Thus the motor is quickly deenergized and braked into stopped position immediately upon the contacting of the fingers 264 and 274, whereby to accurately position the shaft 280 in accordance with the setting from the remote balancing machine control knob 62.

Through the action of the calculating and translating mechanism, previously described, as the shaft 280 is set to position, the shaft 284 is simultaneously brought into the proper position to predetermine the depth of tool penetration in accordance with the weight setting of the knob 62.

Opening of relay contact 362b also extinguishes lamps 60 and 68 and deenergizes relays 354, 356 and 358. Upon deenergization of these relays, contacts 356b and 358b are opened. The opening of contact 356b breaks the holding circuit for the tube 360, and the opening of contacts 358b deenergizes solenoid 272 which allows the housing 268 of the receiver 260 to move back to normal position. The operation of the remote control to effect the setting of the shaft 212 is now complete.

To effect the drilling operation, the drilling machine operator now momentarily presses the "Cycle start" push button 70. This energizes the solenoid 108 which shifts the hydraulic control valve 100 to rapid approach position as previously described. As the approach movement of the tool begins, the limit switch 154 is shifted opening its contacts 154a and closing its contacts 154b. Opening of contacts 154a deenergizes the solenoid 108 in case the "Cycle start" push button has not been released. As shown in Fig. 17, the "Selsyn" transmitter 158 is interconnected with the receivers 202 and 204, as previously described, so that the motion of the transmitter, due to the forward progress of the tool, is proportionally transmitted to both receiver rotors.

Just prior to the engagement of the tool with the work the feed dog 114, Fig. 3, operates to reduce the travel of the head 92 to a feeding speed.

Precisely as the tool engages the work, the normally closed spindle switch 188—190 is opened as previously described. As has been pointed out, one contact of this switch is grounded to the spindle and thus to the frame of the machine. The control wire 19 is also grounded, as shown in Fig. 17.

A cold cathode gaseous discharge tube 374 has its cathode connected to the line 19 and its anode connected to the line 17 through a current limiting resistor 376 and the coil of a control relay 378. The grid or starting electrode of the tube is connected between a pair of resistors 380 and 382 forming a voltage divider between the lines 17 and 19. The spindle switch 188—190 is also connected between the resistors 380 and 382 through a third resistor 384. The resistance of resistors 382 and 384 in parallel is considerably lower than the resistance of resistor 380. Consequently, so long as switch 188—190 remains closed, the voltage of the tube grid is very close to that of the cathode and the tube 374 does not conduct current. As the switch 188—190 is opened, upon engagement of the tool with the work, resistance 384 is cut out. Resistor 382 alone has a much higher resistance than resistor 380 so that the voltage of the tube grid now becomes very near that of the tube anode and the tube conducts current, energizing the relay 378. The capacitor 386 acts to reduce current ripple, as in the case of the capacitor 370 previously described. The combined resistances of the resistors 380 and 384 is kept sufficiently high to prevent any arcing at the switch 188—190.

The energizing of relay 378 causes it to close its contacts 378a whereby to energize a relay 388. The energization of this latter relay causes the closing of its contacts 388a and 388b. The closing of contacts 388b effects the energization of the solenoid 258 which thereupon operates to shift the contact finger 252 of the receiver 204 axially and arrest its rotation. The simultaneous closing of contact 388a energizes the coil of a relay 390 which thereupon closes its contacts 390a and 390b, and opens its normally closed contacts 390c and 390d. The opening of these latter contacts, which occurs simultaneously with the energization of solenoid 258, disconnects receiver 204 from the transmitter 158, the driving force for the receiver rotor thus being disconnected as the rotor is stopped and held in braked condition.

As the tool proceeds to cut into the work piece, the rotor of the receiver 202 continues to move with the forward progress of the tool, and when the tool has penetrated to the proper depth, the fingers 252 and 228 are brought into contact, as previously described. A cold cathode gaseous discharge tube 392 has its anode connected to the control circuit wire 19, and its cathode connected to the wire 17 through a resistor 394 and a control relay 396. The grid or starting electrode of the tube is connected between a pair of resistors 398 and 400, the arrangement being essentially similar to that previously described in reference to the tube 360. Prior to the contacting of the fingers 228 and 252, the tube grid and cathode are at the same voltage and the tube does not conduct current. When the fingers 228 and 252 make contact, the tube fires in the same manner as previously described in reference to tube 360. Capacitors 402 and 404 are provided to effect the functions of capacitors 370 and 372, respectively, previously described. Arcing at the contacts 228 and 252 is prevented as in the case of the contacts 264 and 274.

The firing of the tube energizes relay 396 which thereupon closes its contacts 396a and 396b. The closing of contact 396a forms a holding circuit for the tube around the contact fingers 228 and 252. The closing of contact 396b energizes the solenoid 124 which, as previously described, shifts the hydraulic control valve to its reverse position. The tool is thus immediately and accurately reversed precisely at the point of contact between the fingers 228 and 252.

As the tool starts away from the work, the spindle switch 188—190 recloses. This extinguishes the tube 374 and deenergizes the relay coil 378 which thereupon opens its contacts 378a to deenergize the relay 388 which thereupon opens its contacts 388a and 388b. Opening contact 388a breaks the original energizing circuit to the coil of relay 390, but the contacts 390a, which are now closed, maintain the relay energized. Opening of contact 388b deenergizes the solenoid 258 allowing the axial shifting of the housing of the receiver 204 to its normal position.

As the tool head 92 returns, the rotor of the receiver 202 operates therewith whereas the rotor of receiver 204 remains stationary, the latter being still disconnected from the transmitter 158.

When the tool head reaches home position, the stop dog 116 acts to neutralize the hydraulic control valve, and simultaneously the limit switch 154 is shifted to reopen its contacts 154b and close its contacts 154a. Opening contacts 154b deenergizes the relay 390 which thereupon opens its contacts 390a and 390b and closes its normally closed contacts 390c and 390d. The opening of contacts 154b also deenergizes the solenoid 124. The opening of contacts 390b extinguishes the tube 392, which thereupon deenergizes relay 396 opening its contacts 396a and 396b. The closing of contacts 390c and 390d reconnects the rotor windings of receiver 204 with the rotor windings of the transmitter 158, whereupon the rotor of receiver 204 shifts to a position in synchronism with that of the rotor of the transmitter.

It will be seen that due to the electrical contacts, the "Selsyn" connections, and the electronic tubes provided, rapid and accurate actuation of the control circuits is insured.

Depression of the "Emergency" push button 406 at any time during the forward motion of the tool will energize the solenoid 124 causing the tool to be returned immediately. At the end of such emergency return, the action of the limit switch 154 restores all parts of the circuit ready for a new cutting cycle.

Pressing of the "Stop" button 408 at any time will deenergize the coil of master relay 348, causing the entire control circuit to be deenergized.

Modified arrangements

Figure 12:
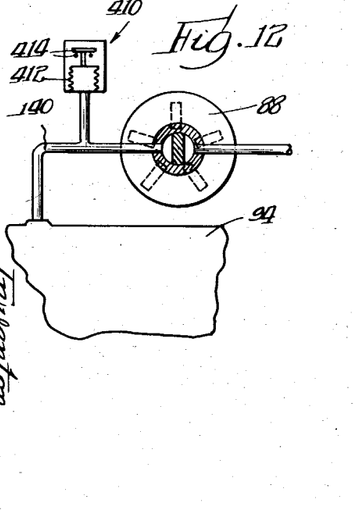
Fig. 12 illustrates a modified embodiment employing pressure control in place of the form of tool spindle shown in Fig. 11.
Figure 13:
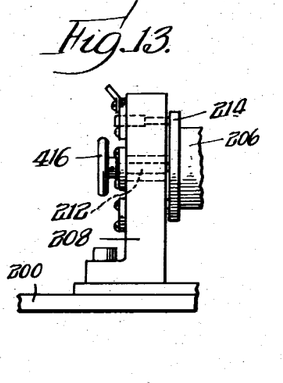
Figs. 13 and 14 illustrate modified arrangements omitting the remote control.
Figure 14:
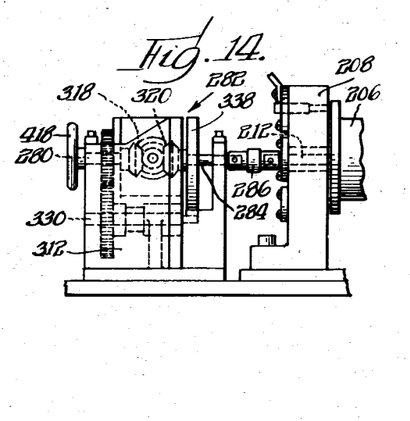

In Figs. 12, 13 and 14 certain modified embodiments are shown.

As illustrated in Fig. 12, pressure control may be substituted for the type of spindle switch shown in Fig. 11. As shown, a pressure switch, generally indicated by the numeral 410, may be interconnected with the pressure line 140 between the feed pump 88 and the hydraulic actuator of the drilling machine. The pressure switch may comprise a bellows 412 interconnected with the pressure line, and a switch structure 414 operated thereby, the arrangement being such that the switch is opened as the pressure within the bellows exceeds a predetermined value.

The normally closed pressure switch of Fig. 12 may be substituted for the normally closed spindle switch 188—190 of Fig. 11, and interconnected in the electrical circuit in the same manner. By setting the pressure switch so that it opens by the increased pressure in the conduit 140, occasioned by the engagement of the tool with the work, it will be seen that the pressure switch functions in the same manner and for the same purpose as the spindle switch structure previously described. If a snap action pressure switch, with substantial contacts is used, the tube 374 may, if desired, be eliminated, the pressure switch serving to directly energize and deenergize the relay 378.

In Fig. 13 an arrangement is shown whereby the setting of shaft 212 may be effected manually, by direct manual actuation, and not by remote control. As will be seen, a manual control knob 416 may be attached to the end of the shaft 212, to effect the setting thereof and control the tool depth penetration, by direct manual actuation and control.

In Fig. 14 a direct manual arrangement for effecting the setting of shaft 212 is also shown, but in this instance also including the translating or calculating mechanism 282, as previously described. As shown, a manual control knob or handle 418 is fixed to the end of shaft 280, in substitution for the arm 278 previously described. The remainder of the parts may be arranged as previously described except that the gears 288 and 290, and their associated driving connections are not provided.

It is obvious that various changes may be made in the specific embodiments set forth without departing from the spirit of the invention. The invention is accordingly not to be limited to the specific embodiments shown and described, but only as indicated in the following claim.

The invention is hereby claimed as follows:

A material working apparatus comprising a work support arranged to support a work piece, a tool support arranged to support a working tool, means for shifting the tool support and work support relative to each other to cause the tool to engage and machine the work, a self-synchronous electric transmitter shiftable by relative movement between the tool and work supports and proportional thereto, a pair of self-synchronous electric receivers each having an element driven by the transmitter, a switch member carried by each receiver element, means for controlling the interconnection between the transmitter and the driven element of one receiver by the engagement of the tool with the work, and means controlled by the contacting of said switch members for terminating the machining operation between the tool and the work piece.

LEANDER JACKSON BULLIET.

REFERENCES CITED

The following references are of record in the file of this patent:

UNITED STATES PATENTS

| Number | Name | Date |
|---|---|---|
| 841,443 | Richards | Jan. 15, 1907 |
| 2,243,379 | Johnson | May 27, 1941 |
| 2,292,846 | Pritchard | Aug. 11, 1942 |
| 2,324,727 | Shartle | July 20, 1943 |
| 2,389,368 | King | Nov. 20, 1945 |
| 2,434,680 | White et al. | Jan. 20, 1948 |